US008868107B2

(12) United States Patent
Bansal (10) Patent No.: US 8,868,107 B2
(45) Date of Patent: Oct. 21, 2014

(54) WIRELESS TERMINAL SURVEILLANCE SYSTEM

(75) Inventor: Ankit Bansal, Uttar Pradesh (IN)

(73) Assignee: Polaris Wireless, Inc., Mountain View, CA (US)

( * ) Notice: Subject to any disclaimer, the term of this patent is extended or adjusted under 35 U.S.C. 154(b) by 290 days.

(21) Appl. No.: 13/477,372

(22) Filed: May 22, 2012

(65) Prior Publication Data

US 2013/0316685 A1 Nov. 28, 2013

(51) Int. Cl.
*H04W 24/00* (2009.01)
(52) U.S. Cl.
USPC ............... 455/456.2; 455/416; 455/456.1; 455/456.3
(58) Field of Classification Search
CPC ........ H04W 24/00; H04W 4/16; H04W 36/00
USPC ................... 455/416, 456.1–456.3
See application file for complete search history.

(56) References Cited

U.S. PATENT DOCUMENTS

| 7,742,763 | B2 | 6/2010 | Jiang | |
| 8,082,197 | B2 * | 12/2011 | Lialiamou et al. | 705/35 |
| 8,354,933 | B2 * | 1/2013 | Bresch et al. | 340/601 |
| 2010/0144373 | A1 * | 6/2010 | Goldfarb et al. | 455/456.3 |
| 2013/0183967 | A1 * | 7/2013 | Olker et al. | 455/435.1 |

* cited by examiner

*Primary Examiner* — Amancio Gonzalez
(74) *Attorney, Agent, or Firm* — Kaplan Breyer Schwarz & Ottesen, LLP (57) ABSTRACT

An illustrative system and method for detecting a wireless terminal in a wireless network by ascertaining information about the wireless terminal's location, thus enabling individualized surveillance and tracking of certain wireless terminals. In some embodiments, the detection is triggered by a signal that is compliant with the Customized Applications for Mobile networks Enhanced Logic ("CAMEL") protocol. Several kinds of mobile-telecommunications events can trigger detection, including events that do not involve call origination. Advantages include bypassing the home location register when obtaining a location estimate for the wireless terminal and when determining whether a wireless terminal is of interest.

22 Claims, 7 Drawing Sheets

WIRELESS TERMINAL SURVEILLANCE SYSTEM

FIELD OF THE INVENTION

The present invention relates to wireless networks in general, and, more particularly, to detecting and locating wireless terminals.

BACKGROUND OF THE INVENTION

Wireless networks enable large numbers of users to take advantage of mobile telephony and data services. To this end, inter-network roaming has become a fairly standard feature that enables mobile users to receive wireless service on their wireless terminals as guests in networks that are not their "home" network across large geographic regions. To support inter-network roaming, the Customized Applications for Mobile network Enhanced Logic set of protocol standards ("CAMEL") has been developed over the years to enable network operators to offer services such as no-prefix dialing in foreign countries and seamless multimedia messaging. CAMEL was originally defined by the European Telecommunications Standards Institute and more recently by the 3GPP group to operate with GSM, UMTS, and 3GPP-based wireless networks. See, e.g., 3GPP Technical Specification, 3rd Generation Partnership Project; Technical Specification group Core Network and Terminals; Customised Applications for Mobile network Enhanced Logic (CAMEL) Phase 4; Stage 2 (Release 9), 3GPP TS 23.078 V9.2.0 (2010-09), which is incorporated by reference herein. A well-known CAMEL-compliant protocol is the CAMEL Application Part ("CAP") signaling protocol. CAP is used for signaling and communication among CAMEL-enabled entities within a wireless network.

A complete list of available and contemplated CAMEL-enabled supplementary services is beyond the scope of the present disclosure, but examples include:

- barring calls or approving a call to continue,
- monitoring a call for call connect and disconnect,
- providing announcements or voice prompts to voice users,
- controlling call duration,
- enabling debits/charges to be applied against a pre-paid wireless calling plan, and providing the user with account balance announcements,
- tracking whether the subscriber is reachable (i.e., in-network) or roaming outside the network,
- controlling mobile-originated and mobile-terminated text messaging through both circuit-switched and packet-switched network entities, and
- enabling the same access number for voice mail across different networks, etc.

CAMEL-enabled entities within a wireless network include one or more service control function entities and the gateway mobile location center, as explained in more detail in regard to FIGS. 1 and 2 below.

In the context of mobile detection, surveillance, and tracking operations, CAMEL-enabled services in the prior art are not well suited for such applications. A mobile detection scenario is illustrated and described in reference to FIGS. 1 and 2 below, accompanied by a discussion of the disadvantages that it presents. FIG. 1 depicts a schematic diagram of a portion of wireless telecommunications network 100 that is available in the prior art. Wireless network 100 comprises: mobile switching center ("MSC") 101, base station controller ("BSC") 103, base station 105, serving mobile location center ("SMLC") 107, gateway mobile location center ("GMLC") 109, home location register ("HLR") 111, service control function ("SCF") entity 113, general packet radio service ("GPRS") support node 115, and wireless telecommunications terminal 150. Wireless network 100 and its constituent elements are well known in the art.

Figure 1:
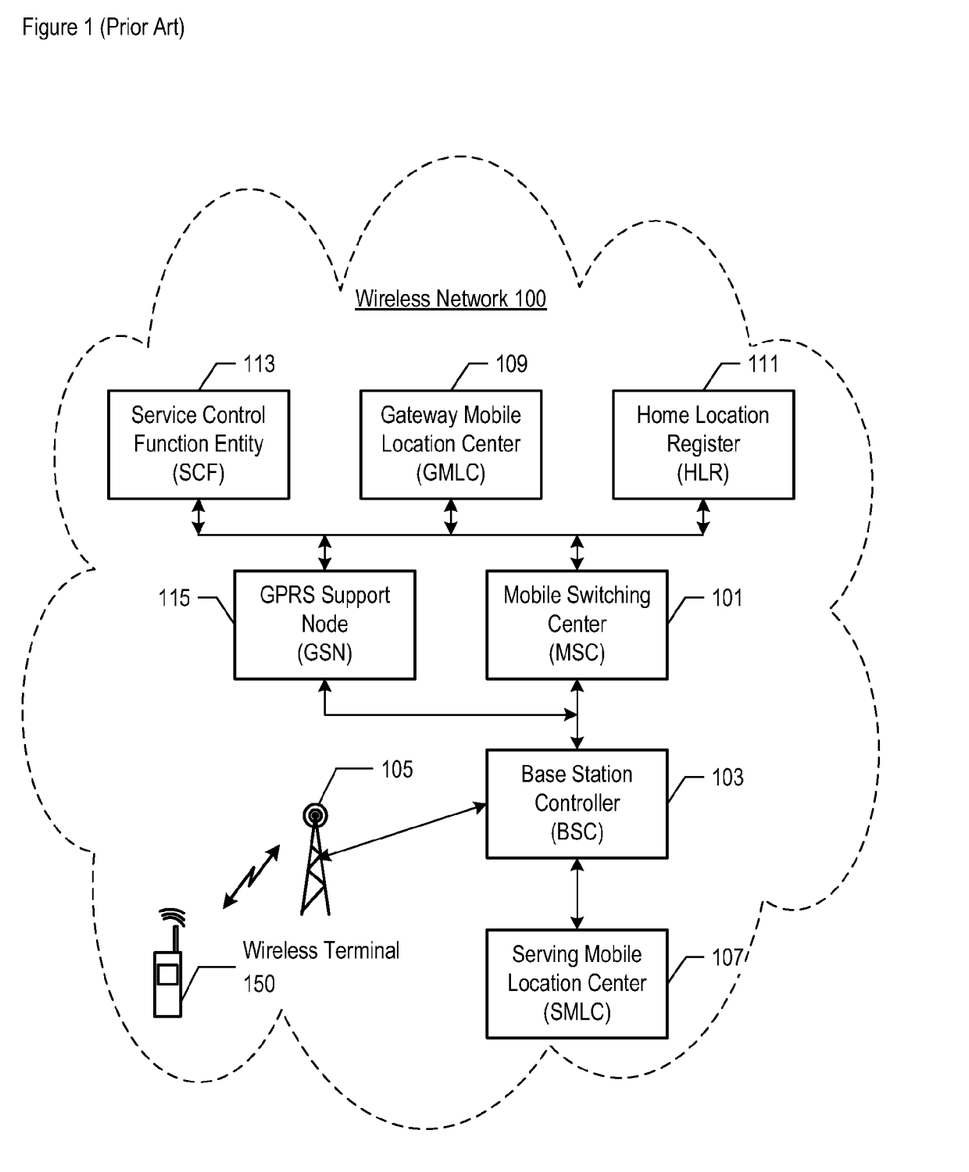
FIG. 1 depicts a schematic diagram of a portion of a typical wireless telecommunications network 100 that is available in the prior art.

Wireless network 100 as illustrated in FIG. 1 is a wireless network that is configured to operate according to the Global System for Mobile Communications ("GSM") standards. The depicted terminology herein, including CAMEL-related terminology, is often GSM-specific for ease of understanding, and more general terms are used in some instances. In some configurations, wireless network 100 could be a Universal Mobile Telecommunications System ("UMTS") network, or based on the 3rd generation Partnership Project ("3GPP") family of standards, or a Code Division Multiple Access ("CDMA") or CDMA-based network. It will be clear to those skilled in the art what the appropriate terms are for non-GSM networks and non-CAMEL protocols.

Mobile switching center ("MSC") 101 is a wireless network element that, among other functions, provides mobility management and circuit switched call support along with connectivity to the Public Switched Telephone Network ("PSTN"). Mobile switching center 101 is CAMEL-enabled, meaning that it (non-exclusively) communicates CAMEL-compliant signaling to and from other elements of wireless network 100 as described in more detail below. In some CAMEL-enabled networks, a CAMEL-enabled mobile switching center 101 also collects information that is needed for pre-paid call accounting and charging. CAMEL-enabled mobile switching centers are well known in the art. For simplicity, distinctions between a serving mobile switching center and other mobile switching centers will be kept to a minimum herein as such distinctions are well known in the art.

Base station controller ("BSC") 103 is responsible for signaling between a wireless terminal and the main switching elements of the network such as mobile switching center 101 and GPRS support node 115. Typically, base station controller 103 controls a plurality of base stations 105, but only one base station 105 is illustrated here for simplicity. Base station controller 103 is well known in the art.

Base station 105 is responsible for the wireless radio frequency ("RF") communication link to the wireless terminals in the area. Base station 105 serves a cell of wireless network 100 and has a unique cell identification within the network. A group of cells define a "location area." As illustrated in FIG. 1, base station 105 is the serving base station to wireless terminal 150, i.e., provides the necessary service that enables voice and/or data services to wireless terminal 150. Base station 105 is well known in the art.

Serving mobile location center ("SMLC") 107 collects information from the wireless terminals that are in service with base station controller 103, e.g., wireless terminal 150, and estimates their respective locations with a certain level of precision or resolution, e.g., estimating a location with a radius of 300 meters. Serving mobile location center 107 is well known in the art.

Gateway mobile location center ("GMLC") 109 is an element of the wireless network that typically interfaces with external location services systems that provide higher level applications. Within wireless network 100, gateway mobile location center 109 transmits location requests to mobile switching center 101 and/or GPRS support node 115 and receives location estimates that were generated by serving mobile location center 107 and transmitted therefrom "upstream" to gateway mobile location center 109. Gateway mobile location center 109 is well known in the art.

Home location register ("HLR") 111 is a centralized element of wireless network 100 that stores subscriber profiles associated with wireless terminals that are authorized to use wireless network 100, whether they are network subscribers or roamers or pre-paid users, etc. Each subscriber profile comprises information that is specific to the particular wireless terminal it is associated with, such as GPRS settings to allow packet services, settings to enable services requested by the subscriber, and location information (that was received from other entities) about the wireless telecommunications terminal, etc. Home location register 111 is well known in the art.

Service control function ("SCF") entity 113 is an element of network 100 that is associated with providing supplemental services, such as CAMEL-based roaming or pre-paid calling. A service control point is an example of a service control function entity. The service control function entity implements the supplemental services desired by the operator, e.g., pre-paid accounting. In GSM networks, there is a CAMEL GSM entity known as the "gsmSCF" that performs the service control function, as is well known in the art. Service control function entity 113 and gateway mobile location center 109 are depicted here as two distinct elements of network 100 to emphasize their distinct functions and roles within the network.

General packet radio service ("GPRS") support node ("GPRS support node") 115 is analogous in some functions to mobile switching center 101, but differs from mobile switching center 101 in that it supports packet data services to the wireless terminals in contrast to the circuit switched service provided by mobile switching center 101. GPRS support node 115 is CAMEL-enabled, meaning that it (non-exclusively) communicates CAMEL-compliant signaling to and from other elements of wireless network 100 as described in more detail below. In some CAMEL-enabled networks, a CAMEL-enabled GPRS support node 115 also collects information that is needed for pre-paid call accounting and charging. GPRS support node 115 is well known in the art.

Wireless terminal 150 is illustratively a GSM cellular telephone. It will be clear to those skilled in the art that wireless terminal 150 can be another type of wireless terminal that is compatible with the serving wireless network, e.g., 3GPP, UMTS, TDMA, CDMA, etc. Wireless terminal 150 can be a cell phone, a smartphone, a data tablet, or a combination thereof. Wireless terminal 150 is well known in the art. When considering detection, surveillance, and tracking of wireless terminal 150, FIG. 2 is instructive.

Figure 2:
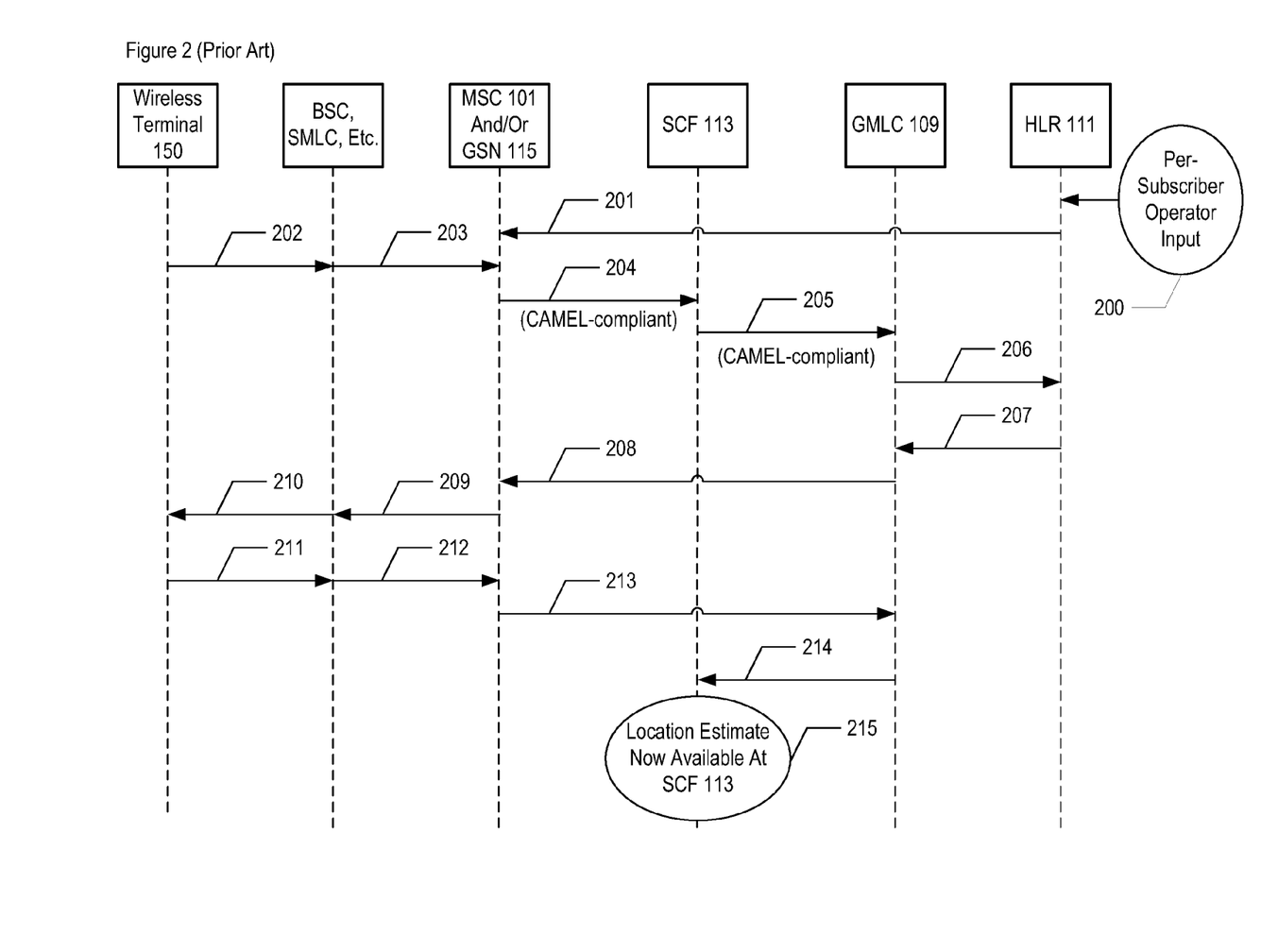
FIG. 2 depicts an illustrative portion of a location-related signal flow among several legacy elements of wireless telecommunications network 100 as is available in the prior art.

FIG. 2 depicts an illustrative portion of a location-related signal flow among several legacy elements of wireless network 100, including wireless terminal 150, base station controller 103, serving mobile location center 107, mobile switching center 101, GPRS support node 115, service control function entity 113, gateway mobile location center 109, and home location register 111—as available in the prior art. FIG. 2 also depicts: per-subscriber operator input 200, signals 201 through 214, and status bubble 215. The illustrative signal flow occurs when a subscriber's identity is flagged for purposes of detecting, tracking, and surveilling the location of the subscriber's wireless terminal. It will be clear to those skilled in the art that this representation is a simplification of actual network signaling traffic, which is intended to improve understanding of the process and is not intended as an exhaustive tutorial.

Bubble 200 represents one or more operations by a network operator to input per-subscriber data into home location register 111. When a subscribing wireless terminal is "of interest" for purposes of surveillance/tracking/detection, the network operator updates the subscriber profile of the given wireless terminal to indicate that it is "of interest" as is well known in the art. Illustratively, the identity of interest is wireless terminal 150. Notably, bubble 200 represents a per-subscriber operation, based on whether the subscribing identity is "of interest" or not. When a subscribing identity is "of interest," the updated subscriber profile indicates that a service control function in the network, e.g., service control function entity 113, is to be notified of the occurrence of one or more mobile-telecommunications events at wireless terminal 150, such as a call origination.

Signal 201 is from home location register 111 to mobile switching center 101 and GPRS support node 115. When wireless terminal 150 receives service from a given mobile switching center and/or GPRS support node, the wireless terminal is said to be "attached" to the respective serving mobile switching center and/or serving GPRS support node. The serving mobile switching center/GPRS support node, upon receiving signal 201, creates a local entry indicating that service control function entity 113 is to be notified when the serving mobile switching center/GPRS support node becomes aware of mobile-telecommunications events occurring at wireless terminal 150.

Signals 202 and 203 are from wireless terminal 150 via network infrastructure element(s) to mobile switching center 101 and/or GPRS support node 115, respectively. These signals notify mobile switching center/GPRS support node of mobile-telecommunications events experienced by the wireless terminal, such as a call origination, a location area update, a call ending, a packet data session origination, etc. Mobile switching center/GPRS support node consults its local data entry indicating that service control function entity 113 is to be notified.

Signal 204 is a CAMEL-compliant signal from mobile switching center/GPRS support node to service control function entity 113 that notifies service control function entity 113 of the mobile-telecommunications event at wireless terminal 150. Illustratively, signal 204 is a CAP signal.

Signal 205 is from service control function entity 113 to gateway mobile location center 109. Signal 205 requests the location of wireless telecommunications terminal 150 from gateway mobile location center 109. Illustratively, signal 205 is also a CAMEL-compliant CAP signal.

Signal 206 is from gateway mobile location center 109 to home location register 111. Signal 206 requests from home location register 111 the identity of the serving mobile switching center/GPRS support node for wireless terminal 150. This information is centrally kept by home location register 111 in wireless network 100.

Signal 207 is from home location register 111 to gateway mobile location center 109, responding with the identity of the serving mobile switching center/GPRS support node.

Signal 208 is from gateway mobile location center 109 to the serving mobile switching center/GPRS support node, e.g., mobile switching center 101 and/or GPRS support node 115, requesting a location for wireless terminal 150.

Signals 209, 210, 211, and 212 collectively represent the location-related signaling among wireless telecommunications terminal 150 and base station controller 103 and serving mobile location center 107 that ultimately provides to the requesting mobile switching center/GPRS support node an estimated location for wireless terminal (in signal 212). Depending on the implementation of the system, the location estimate could be provided by wireless terminal 150, serving mobile location center 107, or base station controller 103 as is well known in the art. As before, this is a simplified representation.

Signal 213 is from serving mobile switching center 101 and/or GPRS support node 115 to gateway mobile location center 109, reporting the estimated location for wireless terminal 150.

Signal 214 is from gateway mobile location center 109 to service control function entity 113, reporting the estimated location for wireless terminal 150.

Bubble 215 indicates that, at the conclusion of the illustrative signal flow, the location estimate for wireless terminal 150 is now available at service control function entity 113. The estimated location can now be used for surveillance or tracking purposes, for example.

As noted earlier, several disadvantages accrue to the prior-art mobile detection method according to the illustrative message flow of FIG. 2. For example:

The "of interest" identities are entered and updated in home location register 111 by the network operator. The fact that the network operator is involved in the surveillance process raises security concerns from the perspective of law enforcement authorities, and further raises privacy concerns from the perspective of those being tracked.

Every time a location request is invoked, a substantial amount of signaling traffic is required.

The home location register is not typically equipped to handle a large number of and/or frequent location detections, thus creating a bottleneck in the wireless network.

A more streamlined approach to mobile detection and surveillance is therefore desirable.

SUMMARY OF THE INVENTION

The inventor of the present invention has recognized that the existing scheme for CAMEL-based supplementary services is unsuitable for surveillance because the surveillance would cause the performance of the wireless telecommunications network to degrade. The inventor has also recognized that it is imprudent to involve civilian network operators in the criminal and military surveillance of mobile terminals because of the likely breach of security.

The illustrative embodiment to the present invention overcomes some of the costs and disadvantages of CAMEL-based systems in the prior art. In particular, the illustrative embodiment locates a wireless terminal in response to a wide variety of mobile-telecommunications events without degrading the performance of the telecommunications network. The estimated location, once obtained by the illustrative embodiment, is then transmitted to one or more external systems. Obtaining the location (or information that is indicative of the location) enables individualized surveillance and tracking of certain wireless terminals of interest, such as tracking suspected criminals, or missing persons, or activity at a crime scene.

The illustrative embodiment controls the kinds of mobile-telecommunications events that are proper triggers for location requests, including events that do not involve call origination. The illustrative embodiment also controls the frequency of location requests necessary to track a particular wireless terminal. The detection is triggered by a signal received by the illustrative embodiment, wherein the signal is compliant with the CAMEL protocol. The illustrative embodiment only initiates the location analysis if it determines that the wireless terminal is "of interest." Preferably, the "of interest" information is stored locally in the illustrative embodiment or in an associated surveillance system that operates outside the wireless network—thus keeping the "of interest" information separate from telephony-related information that is traditionally associated with CAMEL and/or supplementary network services, such as roaming or pre-paid accounting.

Numerous advantages accrue to the illustrative embodiment, including but not limited to:

bypassing the home location register when a location request is invoked, thereby maintaining a measure of secrecy and security over the identities "of interest" and reducing signaling traffic in the network, compatibility with legacy elements in the network infrastructure, including home location registers, mobile switching centers, and GPRS serving nodes, improved control, management, and streamlined maintenance over the kinds of mobile-telecommunications events that are to be recognized as detection/location triggers, by keeping the trigger-related logic in the illustrative embodiment apart from mundane telephony services in the network, improved control, management, and streamlined maintenance over the frequency of location requests after a wireless terminal of interest has been detected, by keeping the frequency logic in the illustrative embodiment, improved privacy, security, control, management, and streamlined maintenance over the wireless terminal "identities of interest," by storing them locally in the illustrative embodiment and/or in the associated external surveillance system.

These advantages, and others, will be clear to those skilled in the art after reading the present disclosure.

An illustrative method that is associated with a wireless network comprises:

receiving a signal by a first data-processing system, wherein:
(i) the signal complies with the Customized Applications for Mobile networks Enhanced Logic ("CAMEL") protocol, and
(ii) the signal indicates that a wireless terminal experienced a mobile-telecommunications event;

transmitting in response to receiving the signal, by the first data-processing system, a request for a location of the wireless terminal; and receiving, by the first data-processing system, a datum that is indicative of the location of the wireless terminal.

DETAILED DESCRIPTION

For the purposes of this specification, the following terms and their inflected forms are defined as follows:

The term "location" is defined as a zero-dimensional point, a one-dimensional line, a two-dimensional area, or a three-dimensional volume. Thus, a location can be defined, for example, by a street address or geographic coordinates or by a perimeter.

The term "wireless telecommunications terminal" is defined as an apparatus that:
  (i) receives signals from another apparatus without a wire, or
  (ii) transmits signals to another apparatus without a wire, or
  (iii) both (i) and (ii).

This term is used synonymously herein with the following terms: wireless terminal, user equipment, mobile terminal, and mobile unit.

Figure 3:
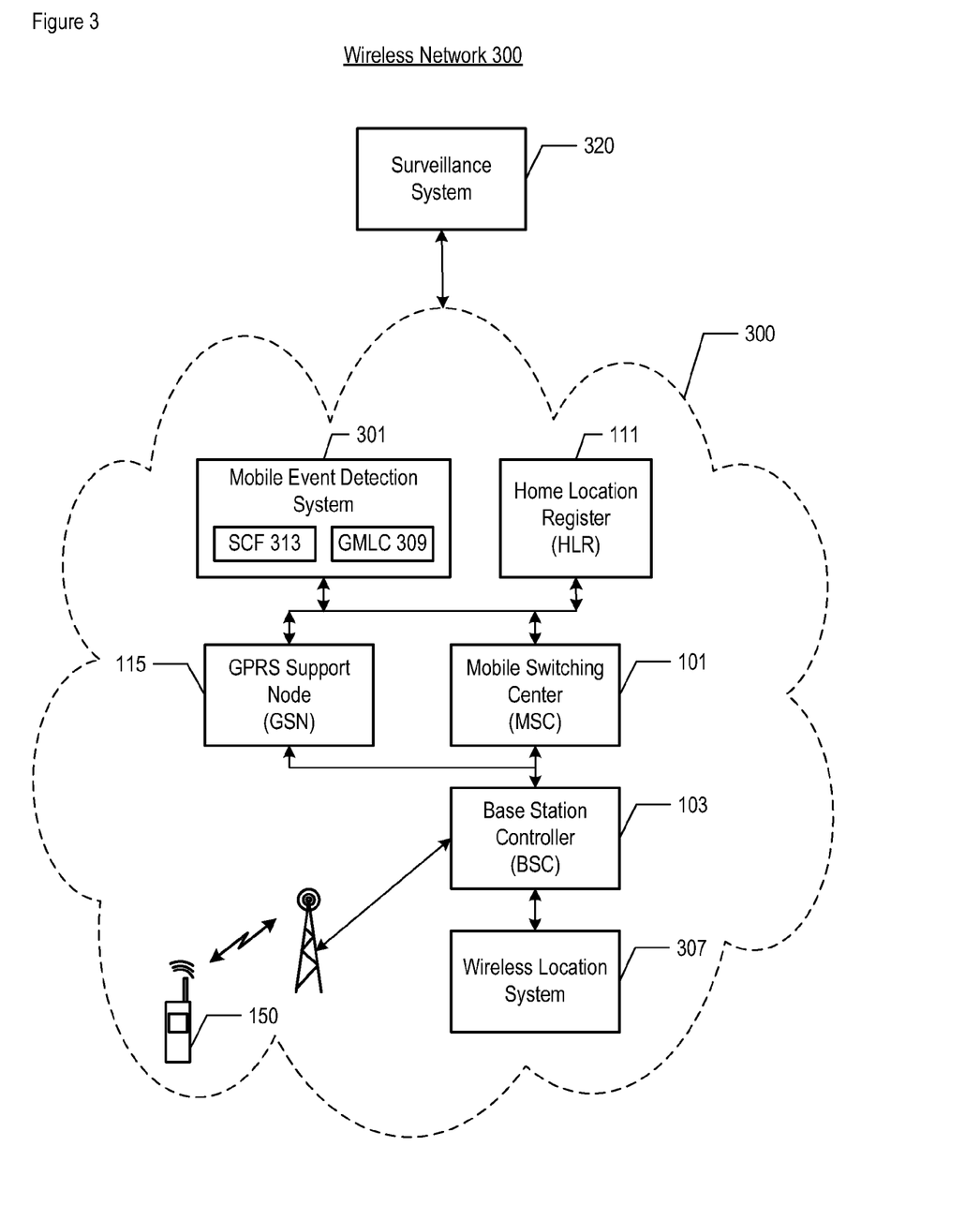
FIG. 3 depicts a schematic diagram of a portion of wireless telecommunications network 300 comprising mobile event detection system 301 according to the illustrative embodiment of the present invention.

FIG. 3 depicts a schematic diagram of the salient portions of wireless telecommunications network 300 in accordance with the illustrative embodiment of the present invention. Wireless telecommunications network 300 comprises: mobile switching center 101, base station controller 103, base station 105 (unlabeled), home location register 111, general packet radio service ("GPRS") support node 115, wireless telecommunications terminal 150, wireless location system 307, and mobile event detection system 301, interrelated as shown. Surveillance system 320 is connected to one or more elements of wireless network 300. Surveillance system 320 is not part of wireless network 300.

Wireless network 300 uses the GSM protocol, but it will be clear to those skilled in the art, after reading the present disclosure, how to make and use alternative embodiments of the present invention that use another protocol (e.g., CDMA, TDMA, UMTS, 3GPP, etc.). Furthermore, it will be clear to those skilled in the art, after reading the present disclosure, how to make and use alternative embodiments of the present invention that use multiple-input and multiple-output ("MIMO") technology. In other words, the systems and methods disclosed herein are agnostic of the particular underlying radio transmission architecture employed in the wireless network, as will be clear after reading the present disclosure. MIMO is well known in the art.

The illustrative embodiment is described using GSM-specific terminology, but it will be clear to those skilled in the art what the appropriate terms are for non-GSM networks.

Mobile switching center 101, base station controller 103, base station 105, home location register 111, GPRS support node 115, and wireless telecommunications terminal 150 are well known in the prior art and are described above.

Mobile event detection system 301 is an element of wireless network 300 that executes and coordinates the operations described herein according to the illustrative embodiment of the present invention. Mobile event detection system 301 is a data-processing system that comprises the hardware, specialized software, and interconnectivity and the accompanying data processing and data communications capabilities that are necessary to execute the operations described herein.

Mobile event detection system 301 is responsible for performing the mobile detection function according to the present invention. Mobile event detection system 301 comprises mobile detection logic that performs the operations in illustrative method 500 and is illustratively embodied as specialized software. Mobile event detection system 301 comprises two logical elements that are logically part of the wireless network infrastructure, namely gateway mobile location center 309 and service control function 313, which are described in more detail below. It will be clear to those skilled in the art, after reading the present disclosure, how to make and use alternative embodiments of mobile event detection system 301 that does not comprise logical elements gateway mobile location center 309 and service control function 313 and instead communicates with one or more of them as distinct and separate entities within wireless network 300.

In some embodiments, mobile event detection system 301 also stores "of interest" information that is necessary for detection, surveillance, and tracking operations. Accordingly, mobile event detection system 301 also comprises one or more digital data stores comprising: the identities of the wireless terminals that are "of interest," e.g., terminals that are associated with known terrorists or criminals, terminals that are known to be stolen, terminals associated with missing persons, etc., and locations that are "of interest," e.g., locations with security concerns, locations at the scene of a crime or terrorist attack, etc. In the illustrative embodiment, these data stores are contained in surveillance system 320, as described in more detail below. In some alternative embodiments, the data stores are contained in part in mobile event detection system 301 and are accessible to/from surveillance system 320.

Wireless location system 307 analyzes data from the network infrastructure and the mobile units to estimate, to a certain resolution, the location of the mobile units in the network. An estimated location provided by wireless location system 307 is a datum that is indicative of (i.e., tends to prove) the location of the wireless terminal. According to some embodiments, wireless location system 307 executes the Wireless Location Signature (WLS™) service from Polaris Wireless, Inc., which performs a mass location analysis that provides relatively high-resolution location estimates for large numbers of mobile units in a given geographic area covered by the wireless network. Wireless location system 307 plays a role that is similar, but not identical, to serving mobile location center 107 depicted in FIG. 1. Wireless location system 307 provides at least some functionality that is different from what a "standard" serving mobile location center 107 provides, such as higher-resolution location estimates for the wireless terminals. Wireless location system 307 is well known in the art.

A preferred embodiment of the present invention comprises wireless location system 307, because it offers relatively higher-resolution location estimates for the wireless terminals in wireless network 300 than an ordinary serving mobile location center 107. However, it will be clear to those skilled in the art, after reading the present disclosure, how to make and use alternative embodiments of the present invention wherein serving mobile location center 107 is installed in place of wireless location system 307 in wireless network 300.

Gateway mobile location center ("GMLC") 309 is a logical element of mobile event detection system 301. Logically, gateway mobile location center 309 is part of the infrastructure of wireless network 300 and performs standard functions that are analogous to the role of gateway mobile location center 109 in wireless network 100. As devised in the illustrative embodiment, gateway mobile location center 309 presents itself to other legacy elements of wireless network 300 with the identity of a legacy gateway mobile location center, thus enabling legacy signaling to occur logically to/from the other legacy elements. In addition to legacy features, gateway mobile location center 309 also comprises communications interfaces to/from service control function 313 and mobile event detection system 301.

Service control function ("SCF") 313 is a logical element of mobile event detection system 301. Logically, service control function 313 is part of the infrastructure of wireless network 300 and performs standard functions that are analogous to the role of service control function entity 113 in wireless network 100. As devised in the illustrative embodiment, service control function 313 presents itself to other legacy elements of wireless network 300 with the identity of a legacy SCF entity, thus enabling legacy signaling to occur logically to/from the other legacy elements. In addition to legacy features, service control function 313 also comprises communications interfaces to/from gateway mobile location center 309 and mobile event detection system 301.

Illustratively, service control function 313 communicates one or more CAMEL-compliant signals that it receives from another element to mobile event detection system 301. Service control function 313 thus enables mobile event detection system 301 to receive CAMEL-compliant signals that indicate the occurrence of mobile-telecommunications events at various wireless terminals in the network. This is described in more detail in regard to FIGS. 5-7.

Surveillance system 320 is an external system that communicates with one or more elements of wireless network 300, and has a communication path to/from mobile event detection system 301. Surveillance system 320 is a data-processing system that comprises and/or connects to digital data storage comprising surveillance/tracking-related data. Some of the functions performed by surveillance system 320 include, but are not limited to:

- storing and/or having access to list(s) of wireless terminal identities that are "of interest,"
- responding to queries from mobile event detection system 301 as to whether a particular wireless terminal is "of interest,"
- transmitting a request for a location of a wireless terminal "of interest" to mobile event detection system 301,
- receiving from mobile event detection system 301 a datum that is indicative of a location of a wireless terminal under surveillance and/or "of interest,"
- receiving from mobile event detection system 301 a report of a mobile-telecommunications event that occurred at a wireless terminal,
- requesting periodic location estimates from mobile event detection system 301 about the location of a wireless terminal that is under surveillance and/or "of interest,"
- transmitting and/or displaying the received estimated location(s) to other law enforcement systems and/or personnel, etc.

The illustrative embodiment wherein the "of interest" data store(s) are maintained and kept in surveillance system 320 (in contrast to within mobile event detection system 301) enables an entity or agency other than the network operator to control and secure the "of interest" data. This kind of configuration decouples the contents of surveillance data, such as lists of persons "of interest" or lists of locations "of interest," from the wireless network operator, thus providing the surveillance system 320 operator with added security and privacy and more secure control over surveillance operations. Accordingly, surveillance system 320 comprises: the identities of the wireless terminals that are "of interest," e.g., terminals that are associated with known terrorists or criminals, terminals that are known to be stolen, terminals associated with missing persons, etc., and locations that are "of interest," e.g., locations with security concerns, locations at the scene of a crime or terrorist attack, etc. Surveillance system 320 further comprises the necessary hardware, interconnections, software, and communications capabilities to communicate to/from mobile event detection system 301.

It will be clear to those skilled in the art, after reading the present disclosure, how to make and use wireless network 300 and surveillance system 320.

Figure 4:
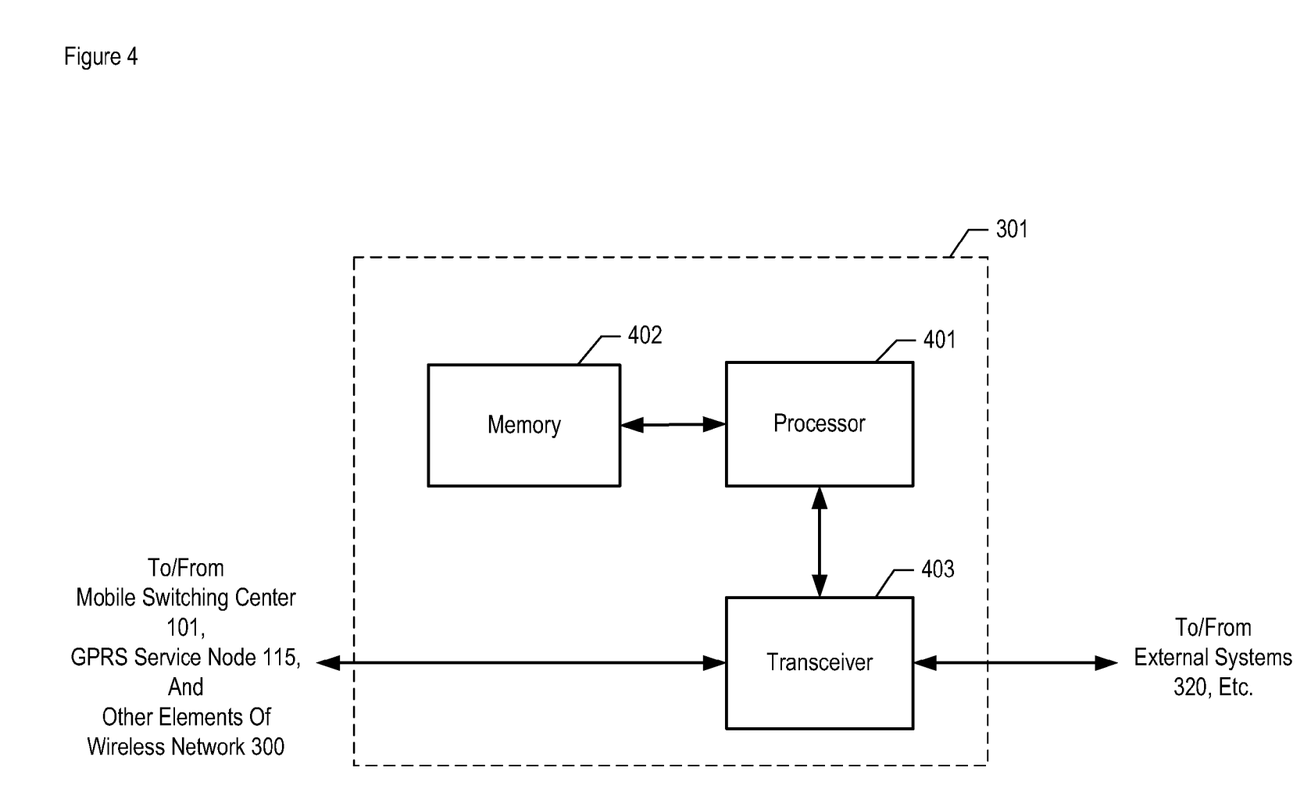
FIG. 4 depicts a block diagram comprising the salient elements of the data-processing hardware platform for illustrative embodiment 301.

FIG. 4 depicts a block diagram comprising the salient elements of the data-processing hardware platform for illustrative embodiment 301 according to the illustrative embodiment. Illustrative embodiment 301 is a data-processing system that comprises: processor 401, memory 402, and transceiver 403. Illustrative embodiment 301 comprises the hardware and requisite software necessary to execute the specialized application software, receive signals, transmit signals, and process data such that it can perform the operations described herein.

Processor 401 is a processing device such as a microprocessor that, in conjunction with the other components of illustrative embodiment 301, executes the software and processes the data according to the operations described herein. Processor 401 is well known in the art.

Memory 402 is a non-transitory memory that stores program code and other data sufficient to enable the execution of software and data processing according to the operations recited herein. Memory 402 is well known in the art.

Transceiver 403 is a component that enables illustrative embodiment 301 to communicate electronically with other components internal and external to wireless network 300. For example, transceiver 403 enables communication pathways to/from mobile switching center 101, GPRS support node 115, and other elements of wireless network 300, and to/from systems that are external to the wireless network, e.g., surveillance system 320. Transceiver 403 is well known in the art.

Figure 5:
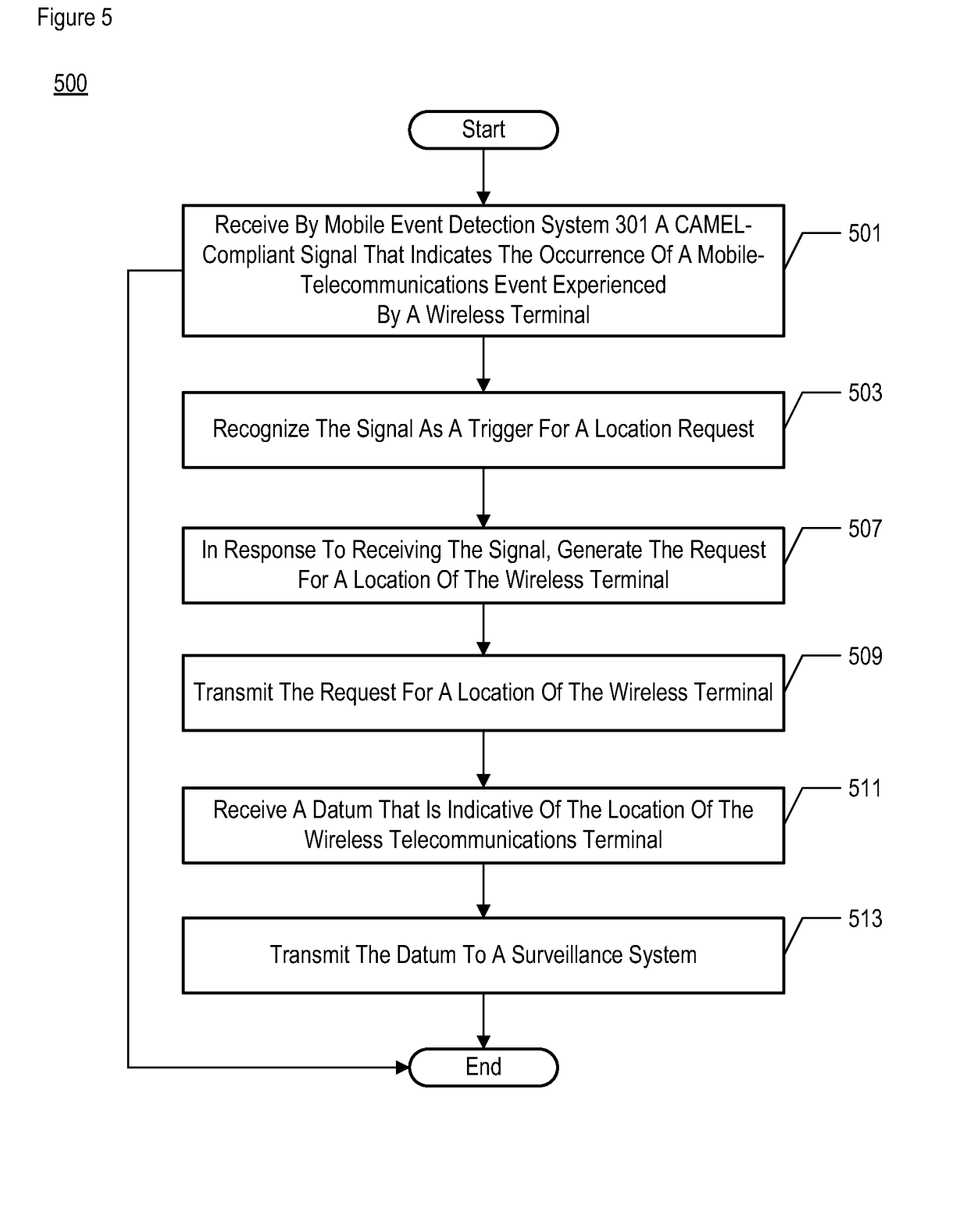
FIG. 5 depicts a flowchart depicting the salient operations of illustrative method 500 according to the illustrative embodiment of the present invention.

The specialized application software that is executed on the hardware platform by illustrative embodiment 301 enables the system to perform the operations in method 500, which is depicted in FIG. 5. It will be clear to those skilled in the art, after reading the present disclosure, that data processing hardware platform of illustrative embodiment 301 can be embodied as a multi-processor platform, as a server, as a sub-component of a larger computing platform, or in some other computing environment—all within the scope of the present invention. It will be clear to those skilled in the art, after reading the present disclosure, how to make and use the data-processing hardware platform for illustrative embodiment 301.

FIG. 5 depicts a flowchart depicting the salient operations of illustrative method 500 according to the illustrative embodiment of the present invention. As noted above, mobile event detection system 301 executes and coordinates these operations.

At operation 501, mobile event detection system 301 receives a CAMEL-compliant signal that indicates that a wireless telecommunications terminal in the network, e.g., wireless terminal 150, experienced a mobile-telecommunications event. In mobile event detection system 301, the signal is logically received by the service control function logical element within the illustrative embodiment, e.g., service control function 313. Once received by the logical element service control function 313, the signal is communicated to the mobile detection logic in illustrative embodiment 301 and is further analyzed therein as described in more detail in FIG. 6.

At operation 503, the mobile detection logic of illustrative embodiment 301 recognizes that, based on the signal, a location request is appropriate. In other words, illustrative embodiment 301 recognizes that the signal should trigger a location request. This operation is important for a detection/tracking/surveillance system that is tasked with finding or tracking a wireless terminal of interest. Thus, once the signal leaves the logical element of service control function 313 and reaches the mobile detection logic of illustrative embodiment 301, it is analyzed further for relevance to mobile detection and location requests. For example, when a call originates from a wireless terminal that is "of interest," a call origination signal triggers a location request in the mobile detection logic of mobile event detection system 301.

According to the illustrative embodiment, certain mobile-telecommunications events are relevant to mobile detection, tracking, and/or surveillance. Control over which kinds of events are relevant is maintained in the mobile detection logic of mobile event detection system 301. In alternative embodiments, control is maintained in surveillance system 320 and communicated to mobile event detection system 301. Examples of relevant mobile-telecommunications events experienced by a wireless terminal include without limitation:

an origination of a voice call by the wireless terminal,
a receiving of a voice call by the wireless terminal,
an establishment of a voice call between the wireless terminal in the wireless network and another telecommunications terminal, whether in the network or elsewhere, i.e., establishing a call connection,
an origination of a Short Message Service ("SMS") message by the wireless terminal,
a receiving of an SMS message by the wireless terminal,
an origination of a text message by the wireless terminal,
a receiving of a text message by the wireless terminal,
a location update request that is transmitted by the wireless terminal to an element of the network infrastructure, wherein the location update request is caused by at least one of the following occurrences:
　powering on the wireless terminal,
　detecting by the wireless terminal that it is in a new location area, and
　originating a data session by the wireless terminal,
a handover of the wireless terminal from one serving cell to another cell,
an International Mobile Subscriber Identity ("IMSI") detach message that is transmitted by the wireless telecommunications terminal,
a powering off by the wireless telecommunications terminal,
an International Mobile Subscriber Identity ("IMSI") attach message that is transmitted by the wireless telecommunications terminal when it powers on, and
a powering on by the wireless telecommunications terminal,
an invocation by the wireless telecommunications terminal of at least one of the following occurrences:
　a CAMEL-compliant Explicit Call Transfer,
　a CAMEL-compliant call deflection, and
　a CAMEL-compliant Multi-Party Call,
an origination by the wireless telecommunications terminal of an Unstructured Supplementary Service Data ("USSD") session,
an origination of a data session by the wireless telecommunications terminal,
an ending of a data session by the wireless telecommunications terminal,
an activation, for the wireless telecommunications terminal, of a packet data protocol ("PDP") context by a GPRS Support Node in the wireless network,
a deactivation, for the wireless telecommunications terminal, of a packet data protocol ("PDP") context by a GPRS Support Node in the wireless network,
the wireless telecommunications terminal attaching to a packet radio data network in the wireless network, and
the wireless telecommunications terminal detaching from the packet radio data network in the wireless network.

Accordingly, when a CAMEL-compliant signal that is received by mobile event detection system 301 indicates the occurrence of one or more of these relevant mobile-telecommunications events, mobile event detection system 301 recognizes that a location request should be invoked.

At operation 507, the mobile detection logic of illustrative embodiment 301 generates a request for a location of the wireless terminal in response to receiving and analyzing the signal. The request seeks a location for the wireless terminal that experienced the mobile-telecommunications event that was reported in the signal. Notably, when periodic location analysis is enabled according to operation 609, the request for the location is renewed periodically.

Figure 7:
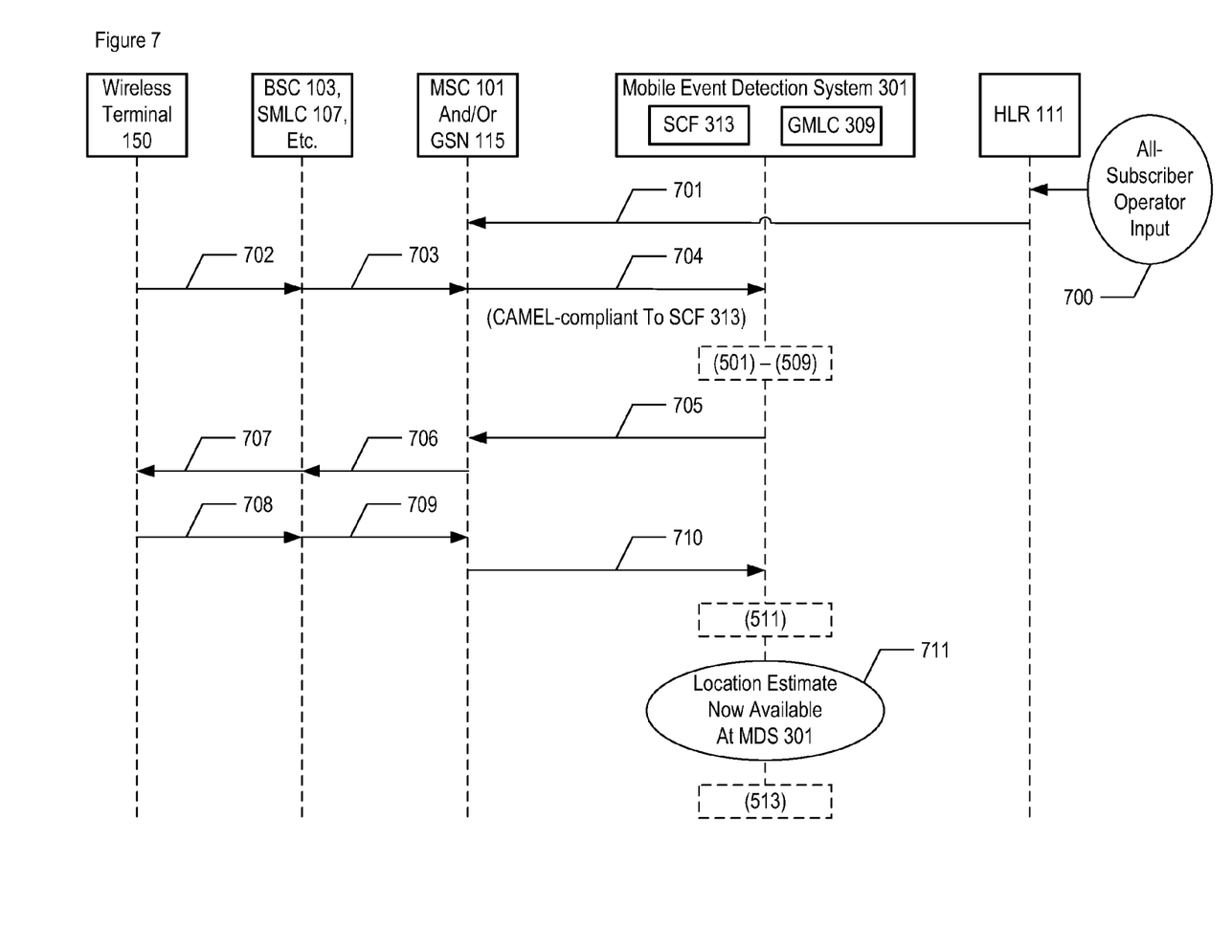
FIG. 7 depicts an illustrative portion of a location-related signal flow among several elements of wireless telecommunications network 300 according to the illustrative embodiment of the present invention.

At operation 509, the mobile detection logic of illustrative embodiment 301 communicates the location request to the gateway mobile location center 309 logical element, which, in turn, transmits the request to another entity within the wireless network. The request for a location of the wireless terminal that experienced the mobile-telecommunications event is transmitted directly to the serving mobile switching center and/or GPRS service node to which the wireless terminal is "attached," e.g., mobile switching center 101 and/or GPRS support node 115, respectively. Notably, the operations associated with obtaining the estimated location for the wireless terminal bypass the home location register in the wireless network. FIG. 7 provides more details on the message flow among the various entities in the wireless network that are involved in handling the location request.

At operation 511, logical element gateway mobile location center 309 in illustrative embodiment 301 receives an estimated location, i.e., a datum that is indicative of the location of the wireless terminal. Logical element gateway mobile location center 309 communicates the datum to the mobile detection logic of mobile event detection system 301. According to the illustrative embodiment, the datum is received from the serving mobile switching center, e.g., mobile switching center 101. For packet data-related mobile-telecommunications events, the datum is received from the serving GPRS service node, e.g., GPRS support node 115. It will be clear to those skilled in the art, after reading the present disclosure, how the signaling operates as between entities in a non-GSM network.

At operation 513, illustrative embodiment 301 transmits the datum to surveillance system 320. Method 500 then ends.

It will be clear to those skilled in the art, after reading the present disclosure, how to make and use alternative embodiments of method 500 wherein the operations are differently sequenced, grouped, or sub-divided—all within the scope of the present invention. It will be further clear to those skilled in the art, after reading the present disclosure, how to make and use alternative embodiments of method 500 wherein some of the recited operations are omitted or executed by other elements of wireless network 300 and/or surveillance system 320.

Figure 6:
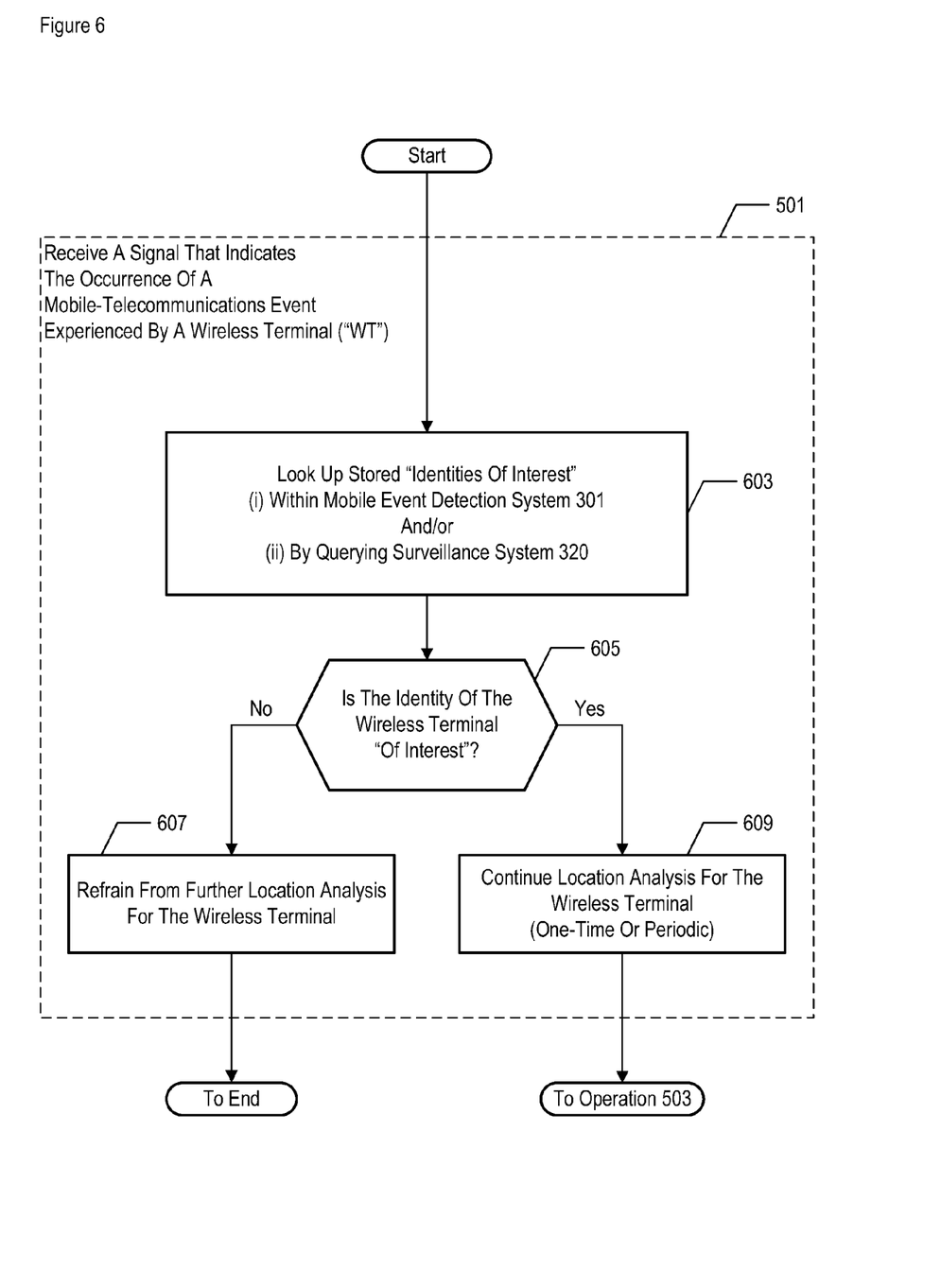
FIG. 6 depicts a flowchart depicting the salient operations of illustrative operation 501 in accordance with the illustrative embodiment of the present invention.

FIG. 6 depicts a flowchart depicting the salient operations of illustrative operation 501 in accordance with an illustrative embodiment of the present invention.

At operation 603, illustrative embodiment 301 performs an analysis to determine whether the identity of the wireless terminal that experienced the mobile-telecommunications event is "of interest" for purposes of location analysis.

According to the preferred embodiment, all the mobile-telecommunications events identified above in paragraph [0066] cause illustrative embodiment 301 to look up whether the identity of the wireless terminal is "of interest." In some alternative embodiments, the mobile detection logic in mobile event detection system 301 performs the look-up only as triggered by certain mobile-telecommunications events but not others. The particular choice of triggering mobile-telecommunications events is left to the discretion of the implements of mobile event detection system 301.

In some embodiments, the "identities of interest" data store is a local digital data structure within mobile event detection system 301, e.g., a database that identifies the identities of those wireless terminals that are targets for mobile detection, tracking, and/or surveillance. In the illustrative embodiment, the "identities of interest" data store is a digital data structure stored in surveillance system 320 as explained in more detail earlier. Notably, according to the illustrative embodiment, home location register 111 is not involved in identifying "identities of interest" in the present operation or in the continuing location analysis of operation 609 (see more details in regard to FIG. 7). According to operation 603, the "of interest" data is looked up (i) locally, within mobile event detection system 301, and/or (ii) by querying surveillance system 320. Examples of an identity that is "of interest" include without limitation: a mobile phone known to be used by a terrorist, a mobile phone belonging to a suspect under surveillance, a mobile phone belonging to a person reported missing, a computing tablet that has been reported stolen, etc.

Operation 605 is a decision point wherein illustrative embodiment 301 determines where to pass control, depending on whether the identity of the wireless terminal is "of interest."

Operation 607 is reached when the identity of wireless terminal 150 is not "of interest." Accordingly, illustrative embodiment 301 refrains from further location analysis and method 500 ends.

Operation 609 is reached when the identity of wireless terminal 150 is "of interest," which means that location analysis will continue. Illustrative embodiment 301 is capable of both one-time location analysis and on-going periodic location analysis, and a combination thereof. The frequency and duration of location analysis for a given wireless terminal is to be determined at the discretion of the implementers. One of the advantages of the present invention is that mobile event detection system 301 can support a sustained surveillance effort, e.g., minute-by-minute location analysis for a given wireless terminal "of interest" without bogging down certain signaling channels within the wireless network such as traffic to/from home location register 111. In the present operation, illustrative embodiment 301 sets surveillance/tracking parameters, such as a time period to be applied for periodic location analysis. After the present operation, control passes to operation 503. In alternative embodiments, the surveillance and tracking parameters are maintained and set in surveillance system 320 and are communicated from there to mobile event detection system 301 to enable operation 609.

FIG. 7 depicts an illustrative portion of a location-related signal flow among several elements of wireless telecommunications network 300 according to the illustrative embodiment of the present invention. FIG. 7 depicts legacy elements of wireless network 300, including wireless terminal 150, infrastructure elements base station controller 103 and serving mobile location center 107/wireless location system 307, mobile switching center 101, GPRS support node 115, and home location register 111. FIG. 7 also depicts mobile event detection system 301, which comprises logical element service control function 313 and logical element gateway mobile location center 309. FIG. 7 also depicts: all-subscriber operator input 700, signals 701 through 710, and status bubble 711. The salient operations of method 500 that occur at mobile event detection system 301 are illustrated parenthetically. This representation is a simplification of actual network signaling traffic that is intended to improve understanding of the process, but is not an exhaustive tutorial.

Bubble 700 represents one or more operations by a network operator. Bubble 700 is an input by the network operator flagging all and every subscriber for mobile detection and surveillance. In contrast to the operation(s) depicted by bubble 200 in FIG. 2, this operation does not categorize or individually identify a particular network subscriber as being or not being "of interest." Instead, every subscriber is identified for mobile detection and surveillance. The "of interest" information resides in mobile event detection system 301 and/or surveillance system 320 as explained in more detail above. This bifurcation as between the home location register 111 and systems 301/320 provides increased privacy, security, and control to the authorities responsible for the mobile detection, surveillance, and tracking operations.

Signal 701 is from home location register 111 to the mobile switching center and/or GPRS support node that is the serving node for each respective wireless terminal, e.g., mobile switching center 101 and general packet radio service node 115. The serving mobile switching center/GPRS support node creates a local entry indicating that service control function 313 is to be notified when the serving mobile switching center/GPRS support node becomes aware of mobile-telecommunications events occurring at wireless terminal 150. Signal 701 is well known in the art and is compatible with legacy elements of wireless network 300.

Signals 702 and 703 are from wireless terminal 150 to network infrastructure element(s) such as base station controller 103, serving mobile location center 107/wireless location system 307, and on to serving mobile switching center 101 and/or GPRS support node 115, respectively. These signals notify the serving mobile switching center/GPRS support node of mobile-telecommunications events experienced by the wireless, for example, a call origination, a location area update, ending a call, a packet data session origination, etc. Mobile switching center/GPRS support node consults its local data entry indicating that service control function 313 is to be notified. Signals 702 and 703 are well known in the art and compatible with legacy elements of wireless network 300.

Signal 704 is a CAMEL-compliant signal from mobile switching center/GPRS support node to logical element service control function 313 in mobile event detection system 301. Signal 704 notifies service control function 313 of the mobile-telecommunications event at wireless terminal 150. Illustratively, signal 704 is a signal according to the CAMEL Application Part ("CAP") signaling protocol. It will be clear to those skilled in the art, after reading the present disclosure, how to make and use alternative embodiments wherein signal 704 is CAMEL-compliant but other than CAP. Signal 704 is well known in the art and is compatible with legacy elements of wireless network 300.

At mobile event detection system 301, the interval between signal 704 and signal 705 comprises the execution of operations 501 through 509, as described in more detail above in reference to method 500. Notably, information in signal 704 is available to mobile event detection system 301, including to the mobile detection logic and logical element gateway mobile location center 309. For example, the identity of the serving mobile service center and/or serving GPRS support node that transmitted signal 704 is now known within mobile event detection system 301; therefore this identity information need not be requested from home location register 111 according to the illustrative embodiment, thereby bypassing home location register 111 whenever a location request is triggered. In contrast, in the prior art as illustrated in FIG. 2, signal 205 was necessary along with signals 206 and 207 to obtain from home location register 111 the identity of the serving mobile switching center and/or GPRS support node to which the wireless terminal is "attached."

Signal 705 is from mobile event detection system 301 to the serving mobile switching center/GPRS support node. Signal 705 requests the location of wireless terminal 150. As explained above, the location request generated by mobile event detection system 301 bypasses the home location register altogether. From the perspective of the receiving mobile switching center/GPRS support node, signal 705 comes from a gateway mobile location center in the wireless network and is compatible with legacy mobile switching center/GPRS support node elements.

Signals 706 through 709 collectively represent the location-related signaling among wireless terminal 150 and base station controller 103 and serving mobile location center 107/wireless location system 307 that ultimately provides to the requesting mobile switching center/GPRS support node an estimated location for wireless terminal 150. As before, this is a simplified representation. Signals 706-709 are well known in the art and compatible with legacy elements of wireless network 300. As explained above, the estimated location is a datum that is indicative of the location of wireless terminal 150 when it experienced the mobile-telecommunications event that triggered the location request. In the preferred embodiment, wireless location system 307 provides the location datum. Depending on the implementation of wireless network 300 in alternative embodiments, the location estimate could be provided by wireless terminal 150, serving mobile location center 107, or base station controller 103, or a combination thereof, as is well known in the art.

Signal 710 is from serving mobile switching center 101 and/or GPRS support node 115 to logic element gateway mobile location center 309 in mobile event detection system 301, reporting the estimated location (i.e., datum that is indicative of the location) for wireless terminal 150. From the perspective of the transmitting mobile switching center/GPRS support node, signal 710 is addressed to the gateway mobile location center in the wireless network. Signal 710 is well known in the art and is compatible with legacy elements of wireless network 300.

Mobile event detection system 301 next executes operation 511, as described in more detail above in reference to method 500.

Bubble 711 indicates that at the conclusion of the illustrative signal flow the location estimate of wireless terminal 150 is now available at mobile event detection system 301. The estimated location can now be used for other operations, such as operation 513 at mobile event detection system 301, as described in more detail above in reference to method 500.

Notably, one of the key differences in the present illustrative signal flow, as compared to the prior art illustrated in FIG. 2, is that fewer signals among network elements are required to obtain the location estimate, i.e., to reach bubble 711. This creates less signaling traffic among elements of wireless network 300. Furthermore, after the initial operator input at bubble 700, home location register 111 is no longer required for either (i) obtaining the location estimate, or (ii) ongoing maintenance/updates to the identities "of interest." Home location register 111 is thereby bypassed, which creates less traffic to/from home location register 111 and keeps home location register 111 from becoming a performance bottleneck or a security risk.

It is to be understood that the disclosure teaches just some examples of illustrative embodiments of the present invention and that many variations of the present invention can easily be devised by those skilled in the art after reading this disclosure. The scope of the present invention is to be determined by the following claims.

What is claimed is:

1. A method that is associated with a wireless network, the method comprising:
    receiving a signal by a data-processing system, wherein:
        (i) the signal complies with the Customized Applications for Mobile networks Enhanced Logic ("CAMEL") protocol, and
        (ii) the signal indicates that a wireless terminal experienced a mobile-telecommunications event;
    transmitting in response to receiving the signal, by the data-processing system, a request for a location of the wireless terminal, such that a home location register is bypassed in obtaining a datum that is indicative of the location of the wireless terminal, wherein the home location register is for storing the subscriber profile of the wireless terminal; and
    receiving, by the data-processing system, the datum that is indicative of the location of the wireless terminal.

2. The method of claim 1 wherein the signal triggers the data-processing system to generate the request for the location.

3. The method of claim 1 wherein the signal is received from a mobile-switching-center in the wireless network, and wherein the request for the location is transmitted from the data-processing system to the mobile-switching-center.

4. The method of claim 1 wherein the signal is received from a packet-data support node in the wireless network, and wherein the request for the location is transmitted from the data-processing system to the packet-data support node.

5. The method of claim 1 wherein the transmitting the request for the location is directly to one of (i) a mobile-switching-center in the wireless network, and (ii) a packet-data support node in the wireless network;
    thereby bypassing the home location register.

6. The method of claim 1 further comprising:
    after the signal is received, periodically transmitting the request for the location by the data-processing system.

7. The method of claim 1 wherein the mobile-telecommunications event is at least one of:
    (i) an origination of a voice call by the wireless terminal,
    (ii) a receiving of a voice call by the wireless terminal, and
    (iii) an establishment of a voice call connection between the wireless terminal and another telecommunications terminal.

8. The method of claim 1 wherein the mobile-telecommunications event is at least one of:
    (i) an origination of a Short Message Service ("SMS") message by the wireless terminal,
    (ii) a receiving of a Short Message Service ("SMS") message by the wireless terminal,
    (iii) an origination of a text message by the wireless terminal, and
    (iv) a receiving of a text message by the wireless terminal.

9. The method of claim 1 wherein the mobile-telecommunications event is a location update request that is transmitted by the wireless terminal.

10. The method of claim 9 wherein the location update request is caused by the wireless terminal performing at least one of (i) powering on, (ii) detecting that it is in a new location area, and (iii) originating a data session.

11. The method of claim 1 wherein the mobile-telecommunications event is a handover.

12. The method of claim 1 wherein the mobile-telecommunications event is at least one of:
   (i) an International Mobile Subscriber Identity ("IMSI") detach message that is transmitted by the wireless terminal,
   (ii) a powering off by the wireless terminal,
   (iii) an International Mobile Subscriber Identity ("IMSI") attach message that is transmitted by the wireless terminal when it powers on, and
   (iv) a powering on by the wireless terminal.

13. The method of claim 1 wherein the mobile-telecommunications event is an invocation by the wireless terminal of at least one of (i) a CAMEL-compliant Explicit Call Transfer, (ii) a CAMEL-compliant call deflection, and (iii) a CAMEL-compliant Multi-Party Call.

14. The method of claim 1 wherein the mobile-telecommunications event is an origination by the wireless terminal of an Unstructured Supplementary Service Data ("USSD") session.

15. The method of claim 1 wherein the mobile-telecommunications event is at least one of:
   (i) an origination of a data session by the wireless terminal,
   (ii) an ending of a data session by the wireless terminal,
   (iii) an activation, for the wireless terminal, of a packet data protocol ("PDP") context by a GPRS Support Node in the wireless network,
   (iv) a deactivation, for the wireless terminal, of a packet data protocol ("PDP") context by a GPRS Support Node in the wireless network,
   (v) the wireless terminal attaching to a packet radio data network in the wireless network, and
   (vi) the wireless terminal detaching from the packet radio data network in the wireless network.

16. A method that is associated with a wireless network, the method comprising:
   receiving a signal by a data-processing system, wherein the signal:
      (i) complies with the Customized Applications for Mobile networks Enhanced Logic ("CAMEL") protocol, and
      (ii) indicates that a wireless terminal in the wireless network experienced a mobile-telecommunications event, and
      (iii) triggers the data-processing system to generate a request for a location of the wireless terminal;
   transmitting the request for the location of the wireless terminal, by the data-processing system directly to one of (i) a mobile-switching-center in the wireless network, and (ii) a packet-data support node in the wireless network, thereby bypassing a home location register in the wireless network; and
   receiving, by the data-processing system, a datum that is indicative of the location of the wireless terminal.

17. The method of claim 16 wherein the wireless terminal is not engaged in a voice call when it experiences the mobile-telecommunications event.

18. The method of claim 16 further comprising:
   retrieving, by the data-processing system from an internal data store thereof, an indication that the identity of the wireless terminal is of interest; and
   transmitting the request for the location only when the identity of the wireless terminal is of interest.

19. The method of claim 16 further comprising:
   retrieving, by the data-processing system from another data-processing system that is connected to the wireless network, an indication that the identity of the wireless terminal is of interest; and
   transmitting the request for the location only when the identity of the wireless terminal is of interest.

20. A method that is associated with a wireless network, the method comprising:
   receiving by a first data-processing system a signal from one of (a) a mobile-switching-center in the wireless network, and (b) a packet-data support node in the wireless network, wherein the signal:
      (i) complies with the Customized Applications for Mobile networks Enhanced Logic ("CAMEL") protocol, and
      (ii) indicates that a wireless terminal in the wireless network experienced a mobile-telecommunications event;
   when, in response to receiving the signal, the first data-processing system determines that the identity of the wireless terminal is of interest, generating by the first data-processing system a request for a location of the wireless terminal;
   transmitting the request for the location of the wireless terminal, by the first data-processing system directly to the one of (a) the mobile-switching-center, and (b) the packet-data support node, respectively, thereby bypassing a home location register in the wireless network; and
   receiving, by the first data-processing system, a datum that is indicative of the location of the wireless terminal.

21. The method of claim 20 wherein the first data-processing system determines whether the identity of the wireless terminal is of interest by querying a second data-processing system that operates outside the wireless network, thereby bypassing the home location register in the wireless network.

22. The method of claim 20 wherein the mobile-telecommunications event is at least one of:
   (i) an origination of a voice call by the wireless terminal,
   (ii) a receiving of a voice call by the wireless terminal,
   (iii) an establishment of a voice call connection between the wireless terminal and another telecommunications terminal,
   (iv) an origination of a Short Message Service ("SMS") message by the wireless terminal,
   (v) a receiving of a Short Message Service ("SMS") message by the wireless terminal,
   (vi) an origination of a text message by the wireless terminal,
   (vii) a receiving of a text message by the wireless terminal,
   (viii) a location update request that is transmitted by the wireless terminal,
   (ix) a handover,
   (x) an International Mobile Subscriber Identity ("IMSI") detach message that is transmitted by the wireless terminal,
   (xi) a powering off by the wireless terminal,
   (xii) an International Mobile Subscriber Identity ("IMSI") attach message that is transmitted by the wireless terminal when it powers on,
   (xiii) a powering on by the wireless terminal, (xiv) an invocation by the wireless terminal of at least one of (a) a CAMEL-compliant Explicit Call Transfer, (b) a CAMEL-compliant call deflection, and (c) a CAMEL-compliant Multi-Party Call,
(xv) an origination by the wireless terminal of an Unstructured Supplementary Service Data ("USSD") session,
(xvi) an origination of a data session by the wireless terminal,
(xvii) an ending of a data session by the wireless terminal,
(xviii) an activation, for the wireless terminal, of a packet data protocol ("PDP") context by a GPRS Support Node in the wireless network,
(xix) a deactivation, for the wireless terminal, of a packet data protocol ("PDP") context by a GPRS Support Node in the wireless network,
(xx) the wireless terminal attaching to a packet radio data network in the wireless network, and
(xxi) the wireless terminal detaching from the packet radio data network in the wireless network.

* * * * *